United States Patent
Rowan et al.

(10) Patent No.: US 6,563,814 B2
(45) Date of Patent: *May 13, 2003

(54) METHOD AND APPARATUS FOR CONTROLLING THE OPERATION OF A DIGITAL TELEPHONE SWITCHBOARD

(75) Inventors: Ray Rowan, New South Wales (AU); Barry O'Sullivan, Marne-la-Vallee (FR); Barry McGuire, Belleville (CA)

(73) Assignee: Northern Telecom Limited, Montreal (CA)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/056,367

(22) Filed: Apr. 7, 1998

(65) Prior Publication Data

US 2003/0043780 A1 Mar. 6, 2003

(51) Int. Cl.⁷ ................................... H04L 12/66
(52) U.S. Cl. ....................... 370/352; 370/401
(58) Field of Search ................... 370/352, 353, 370/354, 355, 356, 357, 401, 402, 403, 404, 405, 422, 423, 424, 463; 379/88.17, 93.01, 93.09, 93.17

(56) References Cited

U.S. PATENT DOCUMENTS

| 3,774,987 | A | | 11/1973 | Boivin |
| 4,796,975 | A | | 1/1989 | Lukas et al. |
| 5,970,126 | A | * | 10/1999 | Bowater et al. ............ 379/114 |
| 6,118,778 | A | * | 9/2000 | Amin ........................ 370/352 |
| 6,157,636 | A | * | 12/2000 | Voit et al. .................. 370/353 |
| 6,188,683 | B1 | * | 2/2001 | Lang et al. ................. 370/352 |

FOREIGN PATENT DOCUMENTS

EP          0784216          1/1997

* cited by examiner

Primary Examiner—Kwang Bin Yao
(74) Attorney, Agent, or Firm—Malin, Haley & DiMaggio, P.A.

(57) ABSTRACT

A digital switchboard is controlled from a remote station to enable the remote station to behave in the same fashion as a local extension and thus have the same facilities as a local extension. This is achieved using a data communications path providing control and data signals to the switchboard to modify the operation of a digital line card to cause a voice terminal at the remote station to be called from the modified line card which then is available to become part of any voice traffic being handled by the switchboard. A computer terminal at the remote station operates as a softphone and together with the voice terminal simulates a call center management console.

6 Claims, 3 Drawing Sheets

METHOD AND APPARATUS FOR CONTROLLING THE OPERATION OF A DIGITAL TELEPHONE SWITCHBOARD

The present invention relates generally to a method and apparatus for controlling the operation of a digital telephone switchboard from a remote location.

BACKGROUND OF INVENTION

Telephone switchboards (PBX) for providing communications within a firm and between the firm and the public switched telephone network are currently based on digital technology and provide users with a wide range of facilities for handling voice calls such as conferencing and diversion as well as operating as so-called call centres.

Although the concept of the call centre is not new, establishing a call centre has until recently, been a costly venture undertaken primarily by enterprises such as telemarketing firms, mail-order houses, and airline reservation companies that conduct a substantial proportion of their business using the telephone. These large-scale call centres usually entail the development of sophisticated custom software, which increases overall call-centre efficiency by tailoring such functions as agent queuing, database interface scripts, call monitoring and call routing and prioritising to meet the specific requirements of each individual application.

This basic technology has more recently been improved by utilizing screen based telephony utilizing computer apparatus that gives the user the full capability to make and answer calls by pressing keys on the computer keyboard or by pointing and clicking with a mouse. This is often known as softphone technology. These systems, however, retain much of the structure of the basic digital PBX and in particular can only monitor and control devices attached to internal telephone lines. They cannot control trunk lines which connect the PBX with the public switched telephone network.

In the past few years, there has been a move to utilize workers who operate from locations remote from the location of the PBX and this desire to utilize so-called teleworkers is prevalent with operations using call centres.

When utilizing teleworkers, it is preferable that the teleworker should have all the voice call facilities of a worker directly connected to the server and this has been best achieved by replacing conventional digital PBX's with telephone switchboards that are either fully computer based or tightly integrated into a local area network in order to provide a general purpose telecom server which provides a wide range of voice and Internet communications features.

It will be appreciated that the major disadvantage of this arrangement is that it is necessary to completely replace the existing digital telephone switchboard and these costs have served as a disincentive to existing digital switchboard users in utilizing teleworkers.

One solution to this problem has previously been proposed by the Assignee of the present invention by providing a computer link between a conventional PBX and a computer utilizing a computer-telephone integration (CTI) interface. Working from computer terminals linked to the PBX and the computer, customer support agents receive or initiate customer calls, update customer accounts, take orders, and troubleshoot problems with products or services. This arrangement has been firer enhanced with the emergence of the telephone application programming interface (TAPI) and the telephone services application programming interface (TSAPI) coupled with such advancements in personal computer technology as multi-tasking, multi-media boards, and higher-speed buses.

While these improvements have enabled wider use of teleworkers they are based on the fact that each teleworker has to have a work station which runs TAPI and TSAPI software applications and they still use CTI communications with the PBX. These two factors constitute limitations on the facilities provided to an outworker and also unnecessary complications.

SUMMARY OF INVENTION

An object of this invention is to provide a method and apparatus for controlling a digital PBX from a remote location by utilizing a communications path which is either an alternative for or additional to the conventional CTI communication path.

A further object of the invention is to provide a method and apparatus for controlling a digital PBX from a remote location by utilizing a data path which is used to control the PBX to create a voice link with the remote location.

The present invention provides a method of controlling a digital PBX from a remote location which is provided with a computer and a voice terminal, the method comprising:

a method of controlling the operation of a digital switchboard from a remote location which is provided with a computer and a voice terminal, the method comprising providing the digital switchboard with a configurable digital line card and means for configuring the digital line card;

using the computer at the remote locations to establish a data link with the digital switchboard, and using the data link to configure the digital line card to establish a virtual telephone set effectively connected to the digital line card and to cause a voice call to be sent to the remote voice terminal.

A further aspect of the present invention provides an Interface apparatus for controlling the connection of a voice call input to a digital telephone switchboard to a remote location, the switchboard having at least two external telephone lines and a number of internal telephone lines, the apparatus comprising a voice server device for creating virtual telephone sets capable of connection to two internal telephone lines, and a computer apparatus connected to the server device and the switchboard for controlling the server device whereby to cause the incoming call to be connected to one of the virtual telephone sets to cause the remote location to be connected to the other of said virtual telephone sets, and to cause the two telephone sets to be linked together whereby to establish the connection between the input voice call and the remote station.

Preferably the connection between the remote location and the computer apparatus is by means of browser software such as JAVA™ so that a work station may be used by the user at the remote location.

The remote location may have a work station and a separate telephone each provided with a separate telephone line. Alternatively, the need for a separate telephone line to the telephone may be removed by the use of voice over Internet software or the use of a 2-channel ISDN line to the work station.

BRIEF DESCRIPTION OF DRAWINGS

In order that the present invention be more readily understood, an embodiment thereof will now be described by way of example only with reference to the accompanying drawings in which.

DETAILED DESCRIPTION

Figure 1:
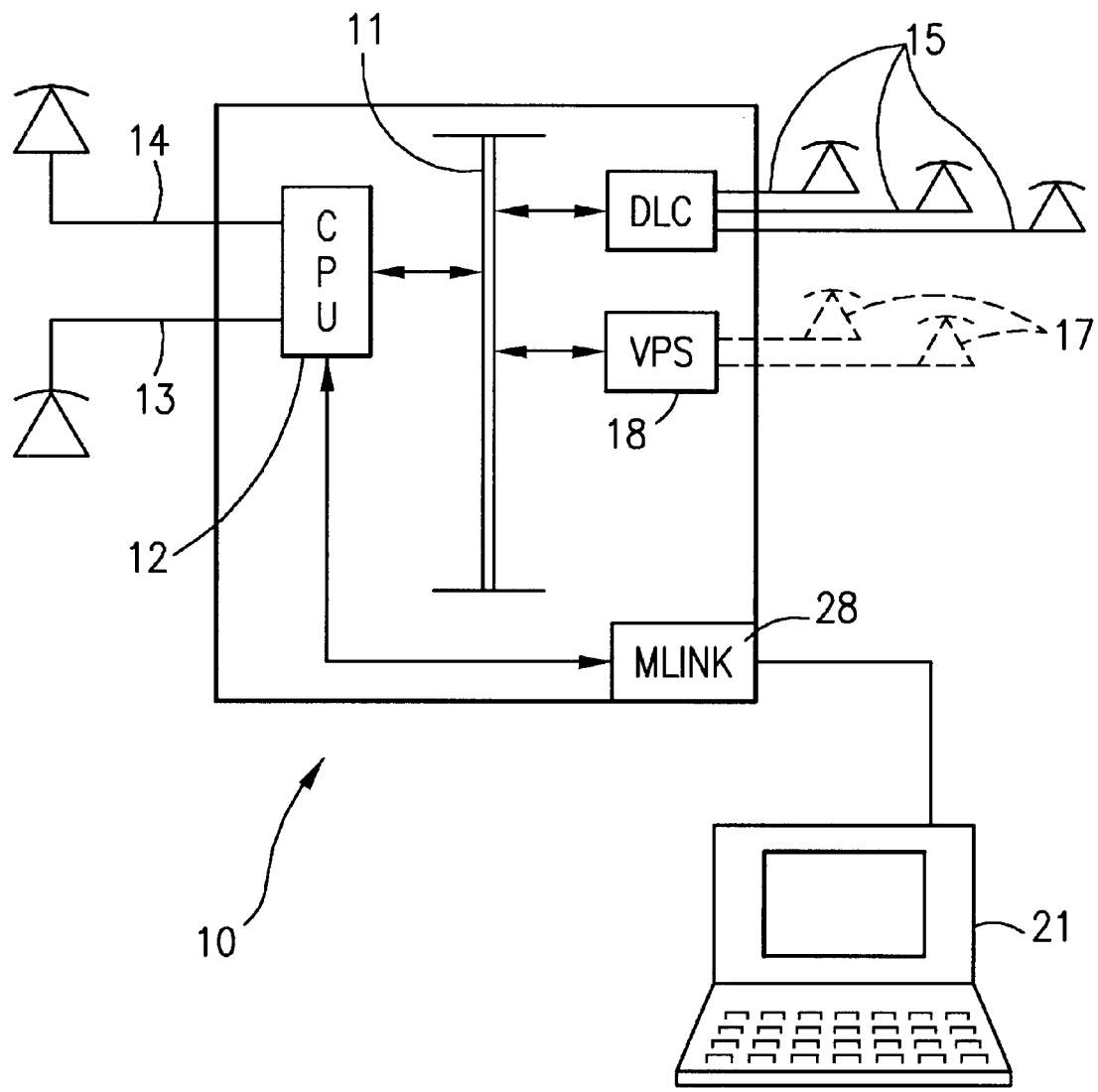
FIG. 1 is a block diagram showing a conventional digital switchboard arrangement.

Before describing the present invention in detail, it is considered helpful to briefly describe a conventional digital switchboard. A block diagram of a convention digital switchboard is shown in FIG. 1 where the switchboard 10 is seen to include a switching backplane 11, the switches of which are controlled by a central processing unit 12 in order to interconnect calls on external lines 13,14 with internal lines 15 via digital line cards 16 interposed between the backplane 11 and the individual internal lines 15. The digital line cards provide all the appropriate signals to the CPU 12 so that a connection can be established between any one of the internal lines 15 and another internal line or an external line 13 or 14 as appropriate.

In normal operations when acting as a call centre, one or more internal telephone sets connected to internal lines 15 have the capability of intercepting calls on other internal lines in order to monitor the traffic on them or take part in the call for some other reason.

The CPU 12 is pre-programmed to configure the PBX and its internal lines in any desired fashion e.g. barring certain extensions from making long distance calls or permitting certain extensions to intercept calls on other internal lines, as would be required for a call centre. These functions can be modified by utilizing an external computer 21 which communicates with the CPU 12 via a special port called the M-link 20 utilizing C.T.I.

The conventional switchboard shown in FIG. 1 includes a voice processing server 18 which is normally used to provide voice mail facilities in the event that a selected one of the internal lines 15 is engaged or not answering. The voice processing software emulates one or more digital line cards so that in the event that one of the internal lines 15 is engaged or not answering, if voicemail services have been set up on that internal line by providing the CPU with the appropriate information, then the CPU will divert the call for the selected internal line to the voice processing server 18 where one of the emulated digital line cards 17 will enable the call connection to be made and the appropriate voice connection established between the voice processing server 18 and the incoming caller.

Figure 2:
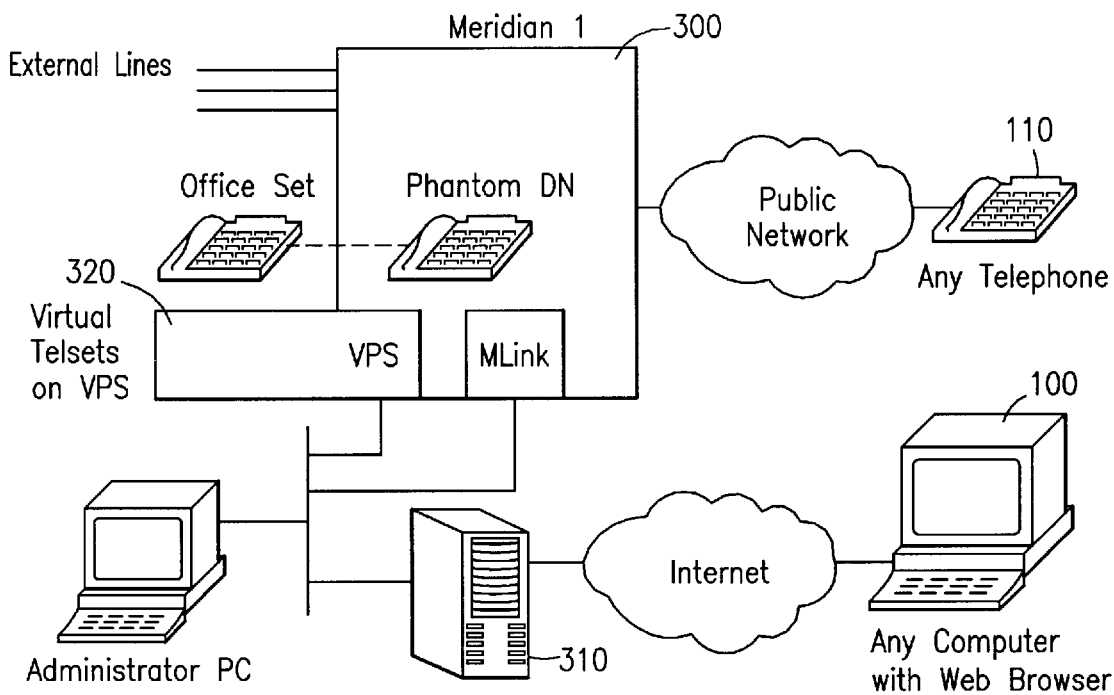
FIG. 2 is a block schematic diagram showing a basic telecommunications network incorporating an embodiment of the invention.

With this basic information in mind, the present invention will now be described with reference to FIG. 2.

A first work station 100 at a remote location comprises a processor 101, a memory 102 storing instructions for execution by the processor 101, a keyboard 103 for providing manual input to the processor 101 and a display 104 for displaying data to an operator of the work station 100. The work station 100 further comprises an interface card for formatting data for transmission to a local area network or to the public switch telephone network.

A voice terminal in the form of a telephone 110 is located near the work station 100 and is intended for the use of the operator of the work station 100. The telephone 110 is connected via the public switched telephone network to a PBX 300.

The PBX 300 is provided, as in FIG. 1, with an M-link 301 and a voice processing server 320. A number of internal extensions 302 are provided only one of which is shown. An administrator computer 303 is shown and this is connected to the M-link via a data bus 304.

A network computer entity in the form of a web call manager device 310 is provided and is arranged to receive calls via the Internet from work stations 100 at remote locations and transfer the calls and/or the requests input at the remote work stations to the PBX 300 via the data bus 304. If the remote work station bus CTI software and capabilities, the requests will be routed to the M-link as has been proposed previously. However, if the remote work station 100 does not have this capability then the web call manager device 310 is arranged to route the request to an interface device 320 which is based on a voice processing server (VPS) which emulates one or more digital line cards.

Figure 3:
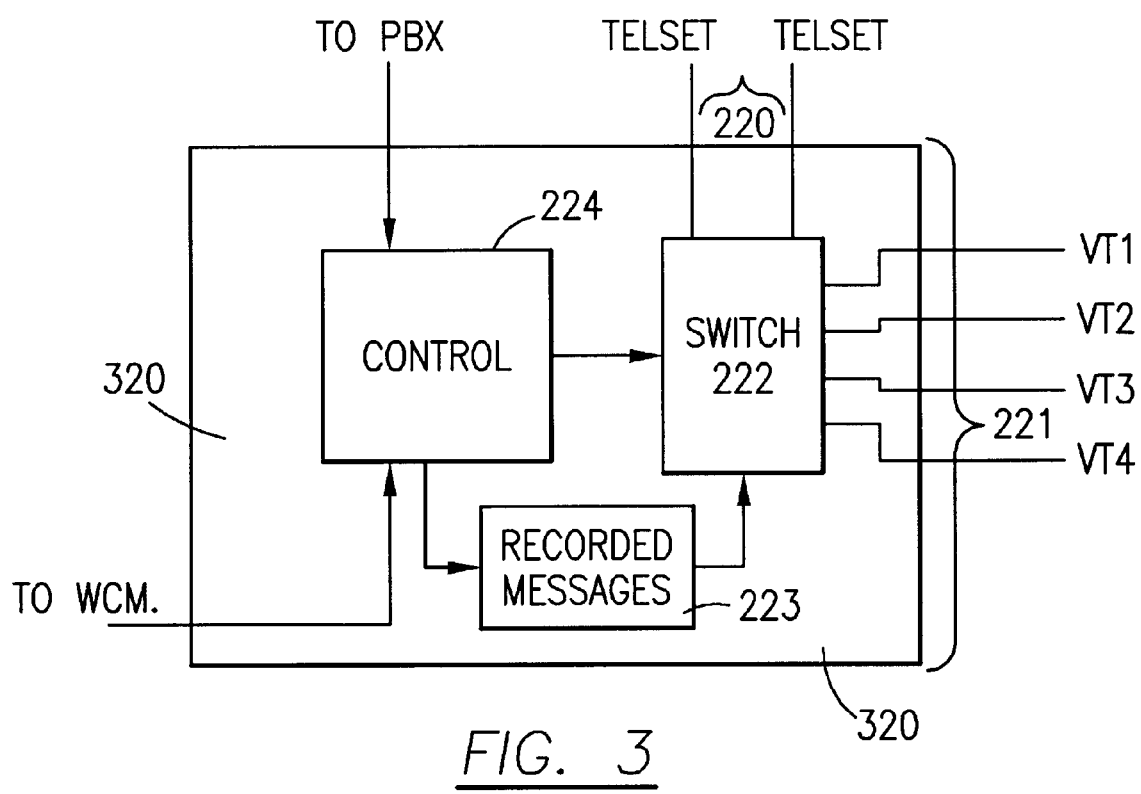
FIG. 3 shows a block schematic diagram of a part of the embodiment shown in FIG. 1.

The voice processing server is shown in more detail in FIG. 3 where it will be seen to comprise a number of ports which can be connected to internal lines of the PBX 300. The ports can be thought to be in two groups, one group of ports 220 being for connection to internal lines connected to office-located telephone sets 302 (FIG. 2) and the other group being for connection to virtual telephone sets VT1–VT4. The lines 220 are connected by a switch means 222 to a recorded message source 223 so that recorded messages may be replayed to an incoming call and to provide voice mail facilities if the desired office-located telephone set is occupied or does not answer. The switch 222 and the source 223 are controlled by a control device 224 which receives a control signal, if needed, from the PBX.

As mentioned above, the server 320 also includes a further group of ports 221 on which virtual telephone sets VT1–VT4 can be established using the control device 224. These virtual telephone sets are used for communicating with remote means via the switch means 222, the control device 224 which in this case may also receive control signals and information from the WCM 310. The virtual telephone sets VT are formed from digital line cards and are capable of producing all the data and control signals one could expect to be generated had a telephone set been connected to the line card. In this way the CPU appears to receive the correct information and permits telephone calls to be terminated with the resulting benefits as will become apparent from the following description.

The equipment shown in FIG. 1 is capable of operation in two different modes. Let us assume that in the first mode the user is in his office in the building served by the PBX 300. In this case, the telephone 110 is connected to the PBX 300 by means of a conventional internal extension line. Also, his work station 100 is also connected to the PBX 300 via a local area network or Intranet and the web call manager device 310. In this way, he has fill control of all the services available to him both in terms of voice and data by the PBX utilizing either his telephone 110 or his work station 100. In this case the link between the web call manager device 310 and the VPS 320 is not utilized.

In the second mode of operation, the telephone 110 and the work station 100 are located remote from the PBX 300, being for example in the user's home. In this situation, the telephone 110 is connected to an external line of the PBX 300 via the public switch telephone network and the work station 100 is connected via the Internet or Intranet to the server 310. In this situation, a normal digital PBX cannot be used by the user in order to provide all the normal functions which would have been expected had the user been on a hard wired internal line associated with the PBX 300. This problem is overcome by creating a virtual telephone in software using the work station 100 and suitably software which is down loaded from the web call manager device 310. It is preferred to utilize the data link between the work station and the web call manager device 310 using suitable "browser software" and in particular software sold under the Registered Trade Mark JAVA for reasons which will become apparent when considering the second mode of operation of the equipment The JAVA applets communicate with the server by way of commands (via user data and command buttons on the keyboard 103) and responses together with status bar updates. The web call manager device 310 controls all calls involving the user using an M-link to the PBX 300 or via the VPS 320.

Figure 4:
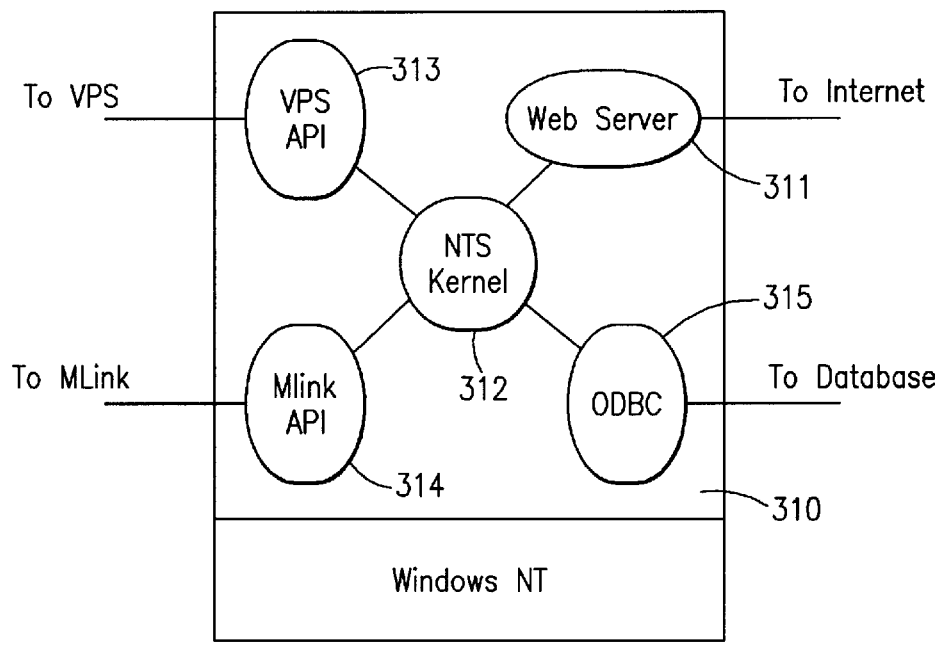
FIG. 4 shows a block schematic diagram of another part of the embodiment shown in FIG. 2.

A preferred embodiment of the web call manager device 310 is shown in block diagram form in FIG. 4 where it is assumed that the server will be constructed on the basis of a Windows NT™ operating system. On this basis, the web call manager device 310 includes a web server 311 connected to the Internet and arranged to supply information from the Internet to a server kernal 312 which in turn accesses and controls links to the voice processing server 320 via the voice processing server application processing interface 313 or to the Mlink via the M-link application processing interface 314. The server also has access to a database via a database interface circuit 315 where details of the or each remote station are stored, including the information needed to be input in the initial screen display seen by the user.

The web server 311 is preferably any JAVA capable word server but in this case it needs to be on the same machine as the kernal 312 as JAVA applets can only open a communication path with the computer which provides them.

A typical operation sequence in the second mode will now be described. Firstly, the user operates the work station 110 to communicate with the server 310 to obtain a JAVA applet therefrom. The initial applet is a log on screen which requires the user to input his identification details, a password and his current telephone number. This information is then transmitted via the Internet or Intranet to the web call manager device 310 which authenticates the user, uses the M-link to put the users office telephone in a call forward mode so as to forward any call to his office telephone number to a virtual telephone created by the voice processing server 320 on a digital line card. The server then initiates a voice call from the virtual teleset to the remote phone 110. At the same time, the server sends a message to the work station 100 advising the user that his phone should ring and requests a confirmation from him of proper operation. On proper confirmation, the server then transmits a JAVA softphone applet to the user's work station 100 so that the user can utilize all the functions of the digital exchange via his workstation but actually make use of his telephone for voice transmission. Until the user logs off with his work station 100, the voice processing server 320 maintains a virtual telephone set assigned to the user.

We now consider how various calls would be handled by this basic system. Let us assume that a third party initiates a call. This is received by the PBX 300 from one of its external lines to the public switch telephone network and forwards the call from the office telephone to the virtual set which the user has created when he logged on to the system. The voice processing server 320 answers the call and can either play a message informing the caller of the transfer to a remote site or can simply give a ringing tone back to the caller. The voice processing server 320 then accesses a further internal line to obtain an external line which is used to ring the user's telephone 110. Simultaneously, the call is monitored by the server 310 and provides the call to the user's web browser preferably with calling line identification or calling party identification if available. At this time, the user utilizes the softphone provided on the work station 100 to indicate that he wishes to receive the call. This information is passed back through the server 310 to the voice processing server 320 which then links the two internal lines to cause the remote telephone 110 to ring whereupon the user answers the call in the normal way. If the caller does not answer the call using the softphone within an administrator specified time, the call can be treated as a normal unanswered call within the PBX 300 so that the caller can be offered the normal suite of possibilities i.e. voicemail, secretary etc.

One further feature of the above system is that if the remote user is in a location where charges per call are high relative to charges for extra time on a call, a time-out parameter may be defined to maintain the link between the PBX and the remote user for a fixed time after a call is ended. If another call is started by the remote user within the time-out period it appears as an extension of the previous. Otherwise the connection is terminated. The time-out period may be changed by the user if desired.

The above operation assumes that the teleworker has been allocated a telephone set connected to an internal telephone line of the PBX. In other words, the extension telephone number relates to a physical telephone set hard wired to the PBX. This could be wasteful and is not, in fact, necessary. The VPS 320 can be suitably configured and emulates a digital line card so that a phantom telephone set is created, i.e. one for which no physical telephone set exists, at a port of the VPS 320.

Although it is theoretically possible to create as many emulated digital line card ports as there are teleworkers this will not usually be needed, thus the PBX can be set up to forward incoming calls destined for teleworkers to one of a small number of ports emulating digital line cards.

For outgoing calls the user uses the softphone and operates a dial button to enter a dial screen on the work station. This request is passed to the WCM 310 which in turn passes the request to the voice processing server 320.

The creation of a virtual telephone set by using a digital line card, preferably in the voice processing server, has the advantage that the virtual telephone set becomes a part of any communications path set up within the switchboard and hence the user of the virtual telephone set has available to him/her all the usual facilities of the switchboard. In the case of a call centre this would include the ability to monitor calls on other lines and so a call centre manager need not be located at the same site as the switchboard. In order words, the call centre manager could be a teleworker.

While the browser software has been indicated above as being JAVA, it will be appreciated that the software could be any browser software depending on the various types of computer equipment used at the remote station and/or the WCM 310. Other variations are also within the scope of the man skilled in the art.

What we claim is:

1. A system for controlling communication between first and second locations which are capable of being in voice and data communication, wherein the first location is provided with;

a digital switchboard connected to a plurality of trunk lines for voice communication and having a plurality of internal lines, a switching device for selectively connecting a trunk line to an internal line, with each internal line having a digital line card; and a computer system connected to the digital switchboard via a CTI pathway and to an external data highway, and said second location having an apparatus for voice communication and a computer connected to the external data highway;

and said digital switchboard further having a processor connected to the computer system and to the digital line cards, said processor having information relating to the second location and being arranged to control at least one of said digital line cards associated with the second location said system providing that when a telephone call from a third party is received by the digital switchboard via a trunk line and is switched via a first internal line to said digital line card associated with the second location, the processor causes a further internal line to be used to initiate voice communication with the second location and to connect the first and further internal lines to be connected together for voice communication between the third party and the second location.

2. A system according to claim 1, wherein a voice processing server is used to provide said at least one digital line card associated with the second location.

3. A system according to claim 1, wherein the data highway is the Internet.

4. A system according to claim 1, wherein the data highway is an Intranet.

5. A system according to claim 1, wherein connection between the computer at the second location and the computer apparatus is by way of "browser software."

6. A system according to claim 1, wherein program information is stored at the computer system at the first location and downloaded to the computer at the second location.

* * * * *

UNITED STATES PATENT AND TRADEMARK OFFICE
CERTIFICATE OF CORRECTION

PATENT NO. : 6,563,814 B2
DATED : May 13, 2003
INVENTOR(S) : Ray Rowan, Barry O'Sullivan and Barry McGuire It is certified that error appears in the above-identified patent and that said Letters Patent is hereby corrected as shown below:

Title page,
Item [75], Inventors, "Barry McGuire" should read -- Thomas McGuire --.

Signed and Sealed this

Tenth Day of May, 2005

JON W. DUDAS
*Director of the United States Patent and Trademark Office*